Nov. 13, 1962  R. J. SLAVSKY  3,063,154
TIRE TREAD GAUGE
Filed June 20, 1960
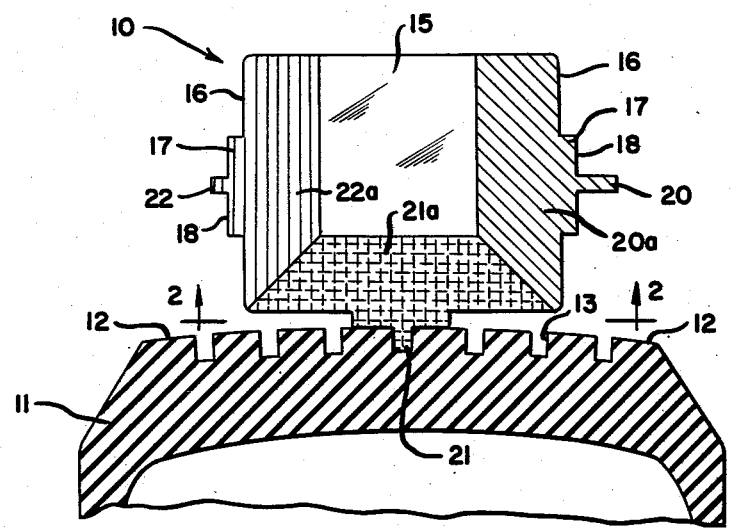
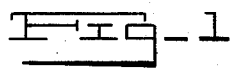
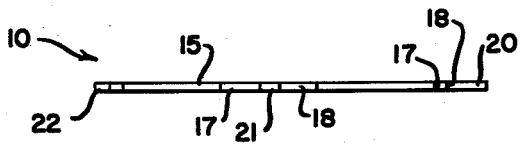
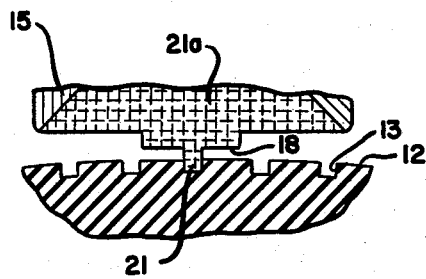
INVENTOR.
ROBERT J. SLAVSKY
BY *Cullen & Canton*
ATTORNEYS

United States Patent Office 3,063,154
Patented Nov. 13, 1962

3,063,154
TIRE TREAD GAUGE
Robert J. Slavsky, Detroit, Mich., assignor to Shaw & Slavsky, Inc., Detroit, Mich.
Filed June 20, 1960, Ser. No. 37,306
2 Claims. (Cl. 33—169)

This invention relates to a tire tread gauge and more particularly to a gauge for use in visually determining whether the tread of an automotive vehicle tire is within certain prescribed safety limits.

Conventional automotive vehicle tires, such as those used on passenger cars, trucks, busses, etc. are provided with treads and grooves at their outer peripheries and these treads wear down as the tire is used. When the tread depth, that is the height of the top tread above the body of the tire, measured in the groove, is worn down to a certain point, the tire is no longer safe, since the tread functions, among other things, to grip the road and prevent skidding of the vehicle relative to the road. Hence, it is desirable to periodically check the treads of the vehicle tires to determine whether they are still within a safe operating range or whether they are at the point where replacement should be contemplated or at the point where safety dictates replacement of the tire.

The average vehicle owner has no convenient means for quickly and periodically checking the treads of his tires and generally does not do so, so that a large percentage of vehicles in use have tires with unsafe treads, that is treads which are worn down to the point where they are no longer functioning properly.

Thus, it is an object of this invention to provide an inexpensive, easily used, tire tread gauge which the ordinary vehicle owner can use to quickly check the treads of his tires and which will visually indicate to him whether the treads are safe or unsafe.

A further object of this invention is to form a tire gauge of a single sheet of thin material, such as plastic sheet, which is durable and will not wear out, and which is formed with means for checking the tread, which means are associated with bright colors and quickly indicate visually whether the treads are within certain prescribed depths so that the vehicle owner may tell at a glance whether his tires are safe or unsafe.

These and other objects and advantages of this invention will become apparent upon reading the following description, of which the attached drawings form a part.

In these drawings:

FIG. 1 is an elevational view of the gauge and shows a fragment of a vehicle tire, in cross-section, being tested by the gauge.

FIG. 2 is an end view taken in the direction of arrows 2—2 of FIG. 1, and

FIG. 3 is a fragmentary view of the gauge and a portion of the vehicle tire and also shows the testing of a tread depth.

The tire tread gauge of this invention, generally designated as 10, is designed for the testing of the depth of tread of a tire 11 which tire may be a conventional automotive vehicle tire such as a passenger car tire, a truck tire, a bus tire or the like and may be a standard tire or what is called a snow and mud tire having wider treads and deeper tread. The treads are indicated as 12 and are spaced apart by grooves or channels 13. The construction of the tire is conventional and forms no part of this invention.

The gauge is formed of a single, flat, thin, sheet of rigid material, such as plastic sheet, and is formed with a body portion 15 having peripheral edges 16. Extended from certain of the edges are base portions 17 provided with straight, flat edges 18 which are spaced from their respective peripheral edges 16 and to which are joined spikes 20, 21 and 22. These spikes are generally rectangular in shape, with one of their narrow ends integrally joined to the bases 18 at the center of the bases.

As shown in FIG. 1, the gauge is formed with three spikes with the spikes being of varying length so that the spike 20 is the longest, 21 the middle length and 22 the shortest.

Each spike, together with its respective base and the adjacent area of the body portion 15, is colored a bright color with the three colors contrasting with one another. For example, the drawing of FIG. 1 is lined so that the area 20a associated with spike 20 is colored green, the area 21a associated with spike 21 is colored amber and the area 22a associated with spike 22 is colored red.

In operation, the gauge is arranged approximately radially of the tire and transverse to the treads and the spikes are successively inserted into the grooves between the treads. If the base of the spike being inserted between the treads contacts the top of the treads, then the heights of the treads are at least greater than the length of the spikes and conversely, if the straight edge 18 of the base does not contact the treads (as shown in FIG. 3), then the tread height (generally called depth in the vernacular) is less than the length of the spike.

The spikes are so selected that the spike 20 indicates a safe depth of tread for ordinary vehicle tires and a minimum safe depth of treads for snow and mud tires. The length of the spike 21 is such as to indicate the minimum depth for normal driving of a vehicle and indicates that the owner of the vehicle should begin looking into replacing his tires particularly if his driving is not of the normal type, but rather involves high speed or long distance driving or the like.

The length of the spike 22 indicates that the depth of tread is in an unsafe range and that the tires should be replaced for safety.

Hence, the area 20a is colored green to indicate that the ordinary tires are safe or that the snow and mud tires are at their minimum safe depth. The area 21a is colored amber to indicate caution, that is, that the tires are usable for normal driving but should be replaced shortly, and the area 22a is colored red to indicate danger, that is, that the tires are unsafe. Obviously, other colors could be used but it is desired that the colors be contrasting and the particular selection of colors is desirable since drivers are accustomed to the three colors of green for go or safe, amber for caution and red for stop or danger.

This invention may be further developed within the scope of the following attached claims. Accordingly, it is desired that the foregoing description be read as being merely illustrative of an operative embodiment of this invention and not in a strictly limiting sense.

Having described an operative embodiment of this invention, I now claim:

1. A tire gauge for use in visually determining whether the height of the tread of an automotive vehicle tire is within certain pre-determined safety limits, comprising a thin, flat, substantially square-shaped sheet of rigid material; three edges of the sheet each having an integral, coplanar, centrally located, elongated, rectangular-shaped base formed thereon, with one of the long edges of each base being integral with its respective sheet edge and the opposite elongated base edge being straight and spaced from and substantially parallel to its respective sheet edge, each of said straight edges being approximately as long as the width of two adjacent tire treads; a thin, narrow, rectangular shaped spike extending perpendicularly outwardly of the center of each base in the plane of the sheet and each being integrally jointed to its respective base at one of its narrow ends; the three spikes each being of a different pre-determined length, the shortest spike being of a length to indicate that the tire tread height is within an unsafe range, the middle length spike being of a length to indicate that the tread height is at a minimum for normal use, and the longest spike being of a length to indicate a safe height for the tire treads, wherein the spikes may be successively inserted into space between two adjacent tire treads, with the sheet arranged substantially radially of the tire and transverse to the treads and their respective bases straddling two adjacent treads, wherein contact between the straight edge of the base of the inserted spike and the tops of the two treads indicate that the tread height exceeds the length of the spike and vice versa, to thereby determine whether the tread height is within the safe, minimum or unsafe ranges.

2. A tire gauge for use in visually determining whether the height of the tread of an automotive vehicle tire is within certain predetermined safety limits, comprising a thin, flat, substantially square-shaped sheet of rigid material, the center portion of at least three of the edges of the sheet being extended outwardly of the sheet, but in the plane of the sheet, to form a centrally located, elongated, rectangular-shaped base having one of its long edges integral with its respective sheet edge and its opposite elongated edge being straight and spaced from and substantially parallel to its respective sheet edge, each of said straight edges being approximately as long as the width of two adjacent tire treads; a thin, narrow, rectangular shaped spike extending radially outwardly of the center of each base in the plane of the sheet and each being integrally joined to its respective base at one of its narrow ends; the three spikes each being of a different pre-determined length, the shortest spike being of a length to indicate that the tire tread height is within an unsafe range and, with its base and adjacent sheet edge area being colored red to visually indicate danger; the middle length spike being of a length to indicate that the tread height is at a minimum for normal use and with its respective base and adjacent sheet edge area being colored amber to indicate visually caution; and the longest spike being of a length to indicate a safe height for the tire treads and, with its respective base and adjacent sheet edge area, being colored green to indicate safety, so that the spikes may be successively inserted into the space between two adjacent tire treads with the sheet arranged substantially radially of the tire and transverse to the treads and with their respective bases straddling two adjacent treads, wherein contact between the straight edge of the base of the inserted spike and the tops of the two treads indicates that the tread height exceeds the length of the spike and vice versa; to thereby visually determine whether the tread height is within the safe, minimum, or unsafe ranges.

References Cited in the file of this patent
UNITED STATES PATENTS

| | | |
|---|---|---|
| 2,229,124 | Philips | Jan. 21, 1941 |
| 2,287,273 | Rabb | June 23, 1942 |
| 2,687,574 | Heal | Aug. 31, 1954 |